United States Patent [19]
Yoshida

[11] Patent Number: 5,727,846
[45] Date of Patent: Mar. 17, 1998

[54] DOUBLE-SIDED RECLINING APPARATUS

[75] Inventor: Tomonori Yoshida, Yokohama, Japan

[73] Assignee: Ikeda Bussan Co., Ltd., Ayase, Japan

[21] Appl. No.: 680,846

[22] Filed: Jul. 16, 1996

[30] Foreign Application Priority Data

Jul. 19, 1995 [JP] Japan .................................. 7-205348

[51] Int. Cl.$^6$ ...................................................... B60N 2/02
[52] U.S. Cl. ...................................... 297/373; 297/354.12
[58] Field of Search ........................... 297/354.12, 361.1, 297/362, 366, 367, 373; 475/162, 177

[56] References Cited

U.S. PATENT DOCUMENTS

| | | | |
|---|---|---|---|
| 4,143,905 | 3/1979 | Hensel et al. | 297/361.1 X |
| 4,184,714 | 1/1980 | Courtois | 297/373 X |
| 4,541,672 | 9/1985 | Fukuta et al. | 297/367 |
| 4,874,205 | 10/1989 | Arefinejad et al. | |
| 5,161,856 | 11/1992 | Nishino | 297/367 |

FOREIGN PATENT DOCUMENTS

| | | |
|---|---|---|
| 63-77407 | 4/1988 | Japan . |
| 4-83041 | 7/1992 | Japan . |

*Primary Examiner*—Milton Nelson, Jr.
*Attorney, Agent, or Firm*—Foley & Lardner

[57] ABSTRACT

A double-sided reclining apparatus, comprising a first reclining device equipped with a reclining-lever handle and a second reclining device. Each reclining device includes a base to be fixedly connected to a seat cushion and an arm adapted to be fixedly connected to a seat back and rotatably supported on the base through a pivot shaft. The arm has a first toothed portion. A cam and a toothed cam follower are in cam-connection with each other. The toothed cam follower has a second toothed portion meshable with and unmeshable from said first toothed portion, said cam and said toothed cam follower are cooperative with each other for causing meshed-engagement of the second toothed portion with the first toothed portion through a rotary motion of the cam in a first rotational direction to lock the reclining device, and for causing disengagement of the second toothed portion from the first toothed portion through a rotary motion of the cam in a second rotational direction opposed to the first rotational direction to unlock the reclining device. The cam included in the outside reclining device is mechanically linked to the cam included in the second reclining device through a connecting pipe. A cam profile of the cam included in the second reclining device is formed with at least one raised portion.

6 Claims, 6 Drawing Sheets

DOUBLE-SIDED RECLINING APPARATUS

BACKGROUND OF THE INVENTION

1. Field of the Invention

The present invention relates to a double-sided reclining apparatus and more specifically to a double-sided seat reclining apparatus in which a pair of reclining devices, mechanically linked to each other, are attached to both sides of an automotive seat to ensure an angular adjustment of a seat back.

2. Description of the Prior Art

As is generally known, on earlier model cars, a double-sided seat reclining apparatus is ordinarily used for enhancing a holding performance of a seat back adjusted at a desired angular position and for providing a long-life reclining device. Japanese Patent Provisional Publication No. 63-77407 and Japanese Utility-Model Provisional Publication No. 4-83041 have disclosed such a double-sided reclining apparatus. The reclining apparatus disclosed in the Japanese Patent Provisional Publication No. 63-77407 is different from that of the Japanese Utility-Model Provisional Publication No. 4-83041 in that the structures of their meshing/unmeshing (locking/unlocking) mechanisms, each of which is provided for engagement and dis-engagement between a sector gear and a toothed lock plate, are different from each other. The above-mentioned two prior-art apparatus are in common with each other, in that a pair of left and right reclining devices are mechanically linked to each other through a connecting rod or pipe for the purpose of synchronized meshing/unmeshing operation between the left and right reclining devices. In consideration of productivity, geometry and dimensions of one side reclining device are essentially identical to those of the other side reclining device, except that either one of the reclining devices has a reclining lever (or an operating lever) manually operated for angular adjustment. However, due to a dimensional error and an unsatisfactory accuracy of assembling process, there would occur slight phase-mismatching between the meshing/unmeshing mechanisms employed in the pair of reclining devices. Also, there is a tendency for the phase-mismatching to occur due to torsion of the connecting rod or pipe. The previously-noted reclining seat employing the double-sided reclining apparatus is often mounted on a vehicle floor panel as a driver seat or an assistant seat. In such a case, the outer side reclining device is usually equipped with a reclining lever or an operating lever for the purpose of the tilt of the seat back. The driver or passenger can easily feel the meshing/unmeshing state of the mechanism by his or her hand which rests on the lever. As may be appreciated, the inner side reclining device ordinarily tends to operate with a slight phase lag in comparison with the outer side reclining device having the reclining lever, owing to various factors, such as dimensional errors, torsion of the connecting rod, or inadmissible play of the linkage transmitting the reclining-lever action from one reclining device having the lever through the connecting rod to the other reclining device, which play exceeds the tolerance specified by the reclining seat's manufacturer. In the event that there is undesirable phase lag of the inside reclining device relative to the outside reclining device in the double-sided reclining apparatus, the vehicle occupant may feel uncomfortable during operation of the reclining lever, owing to unstable reclining-lever action resulting from the remarkable phase-mismatching between a pair of reclining devices or from the phase lag of the inside reclining device with respect to the outside reclining device.

SUMMARY OF THE INVENTION

Accordingly, it is an object of the present invention to provide an improved double-sided reclining apparatus which avoids the foregoing disadvantages of the prior art.

It is another object of the invention to provide a double-sided reclining apparatus which can enhance a performance or reliability of the apparatus and provide a stable reclining-lever action, insuring a good feeling of the reclining-lever action.

It is a further object of the invention to provide a double-sided reclining apparatus which can eliminate a phase lag of an inside reclining device not employing a reclining-lever handle relative to an outside reclining device employing a reclining-lever handle.

In order to accomplish the aforementioned and other objects of the invention, a double-sided reclining apparatus, comprises a first reclining device equipped with a reclining-lever handle and a second reclining device, each including a base fixedly connected to a seat cushion, an arm fixedly connected to a seat back and rotatably supported on the base through a pivot shaft, the arm having a first toothed portion, and a set of cam and toothed cam follower in cam-connection with each other, the toothed cam follower having a second toothed portion meshable with and unmeshable from the first toothed portion, the cam and the toothed cam follower being cooperative with each other for causing meshed-engagement of the second toothed portion with the first toothed portion through a rotary motion of the cam in a first rotational direction to lock the reclining device, and for causing dis-engagement of the second toothed portion from the first toothed portion through a rotary motion of the cam in a second rotational direction opposing the first rotational direction to unlock the reclining device, and a connecting pipe through which the cam included in the first reclining device is mechanically linked to the cam included in the second reclining device, wherein a cam profile of the cam included in the second reclining device is formed with at least one raised portion such as enlarged from a cam profile of the cam included in the first reclining device, for providing a mechanical phase-lead of the second reclining device with respect to both locking and unlocking actions of the first reclining device.

According to another aspect of the invention, a double-sided reclining apparatus for an automobile seat, comprises an inside reclining device facing to a center line of an automotive vehicle and an outside reclining device facing apart from the center line, each of the inside and outside reclining devices including a base fixedly connected to a seat cushion, an arm fixedly connected to a seat back and rotatably supported on the base, the arm having a diametrically opposing inner toothed portions, a pair of toothed cam followers, each having first and second cam-follower portions, and a toothed portion meshable with and unmeshable from an associated one of the inner toothed portions, a cam member being formed on an outer periphery thereof with a first cam portion which is in cam-connection with the first cam-follower portion and a second cam portion which is in cam-connection with the second cam-follower portion, a pivot shaft firmly fitted to the cam member for causing meshed-engagement of the toothed portions with the inner toothed portions through a rotary motion of the pivot shaft in a first rotational direction to lock the reclining device, and for causing dis-engagement of the toothed portions from the inner toothed portions through a rotary motion of the pivot shaft in a second rotational direction opposing the first rotational direction to unlock the reclining device, and means for biasing the pivot shaft in the first rotational direction, and a connecting pipe through which the pivot shaft fitted to the cam member included in the outside reclining device is mechanically linked to the pivot shaft fitted to the cam member included in the inside reclining device, wherein the first and second cam portions of the cam member included in the inside reclining device are formed with raised portions such as enlarged from each cam profile of the first and second cam portions of the cam member included in the outside reclining device, for providing a mechanical phase-lead of the inside reclining device with respect to both locking and unlocking actions of the outside reclining device equipped with a reclining-lever handle. Each of the inside and outside reclining devices further comprises a guide for guiding the toothed cam followers to cause a radially outward sliding movement of each of the toothed cam followers towards the inner toothed portion through the cam-connection between the first cam portion and the first cam-follower portion during the rotary motion of the cam member together with the pivot shaft in the first rotational direction and to cause a radially inward sliding movement of each of the toothed cam followers apart from the inner toothed portion through the cam-connection between the second cam portion and the second cam-follower portion during the rotary motion of the cam member together with the pivot shaft in the second rotational direction.

DESCRIPTION OF THE PREFERRED EMBODIMENTS

Figure 6:
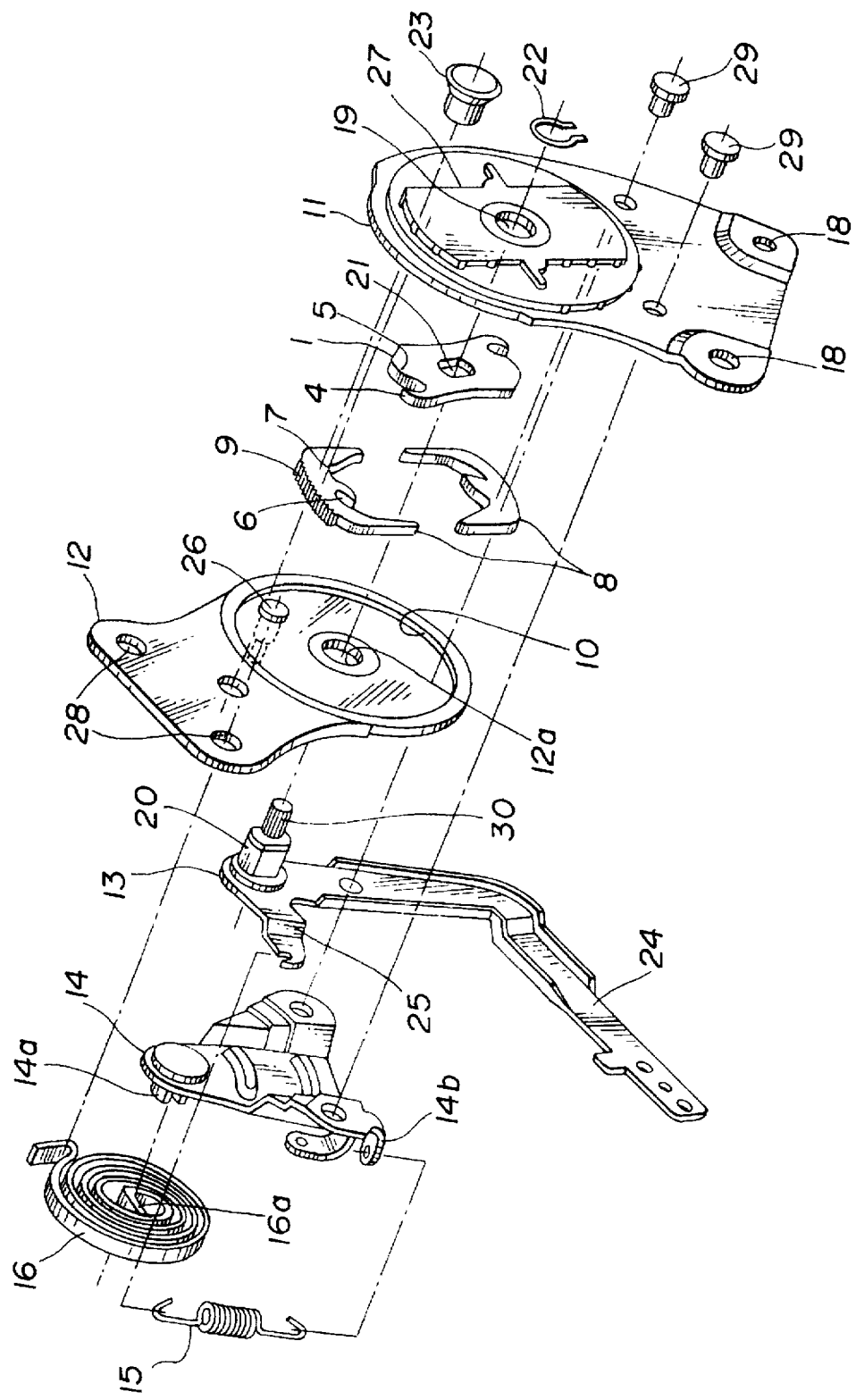
FIG. 6 is a dis-assembled view illustrating components of the outside reclining device employed in the apparatus of the embodiment.
Figure 7:
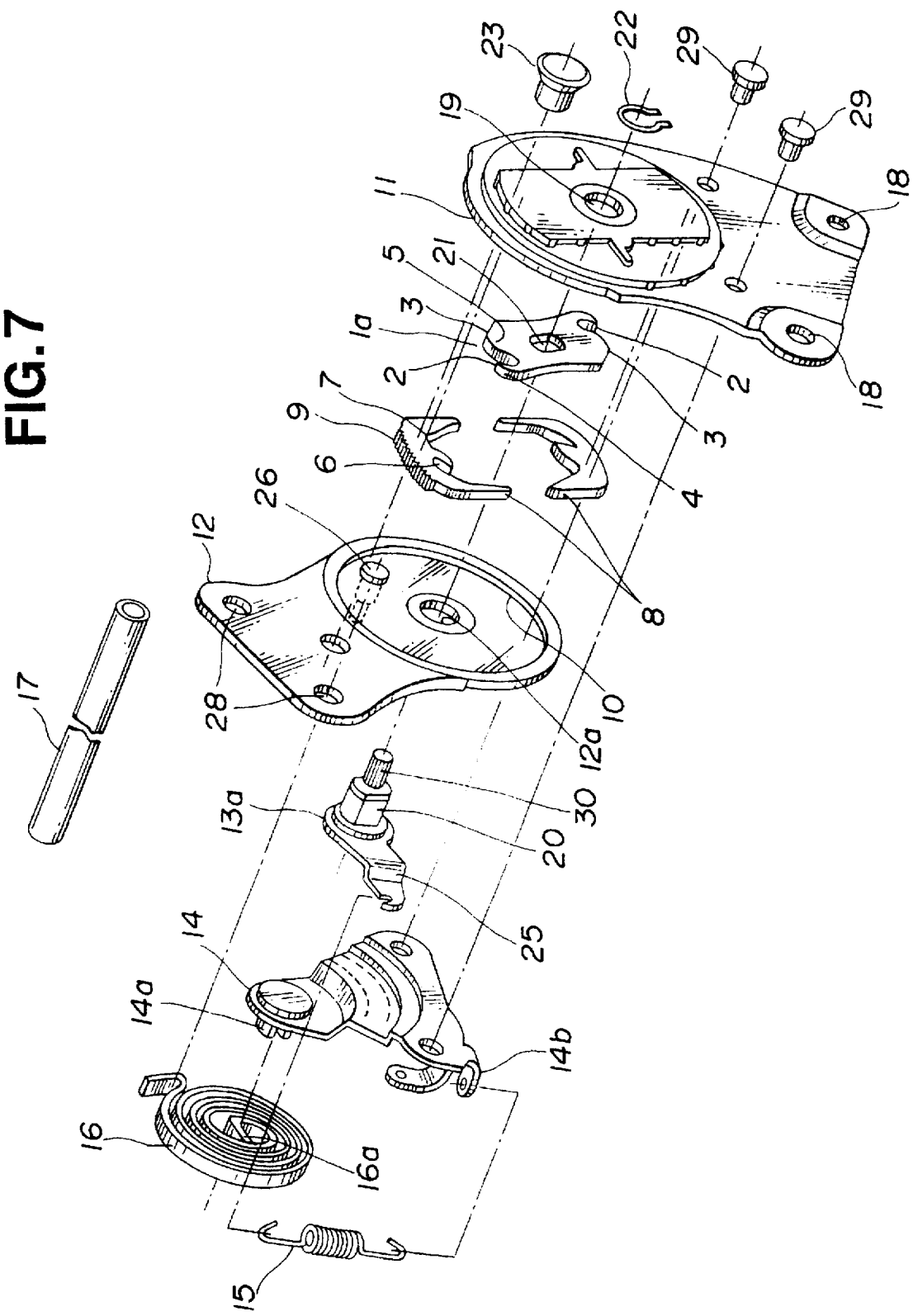
FIG. 7 is a dis-assembled view illustrating components of the inside reclining device employed in the apparatus of the embodiment.
Figure 8:
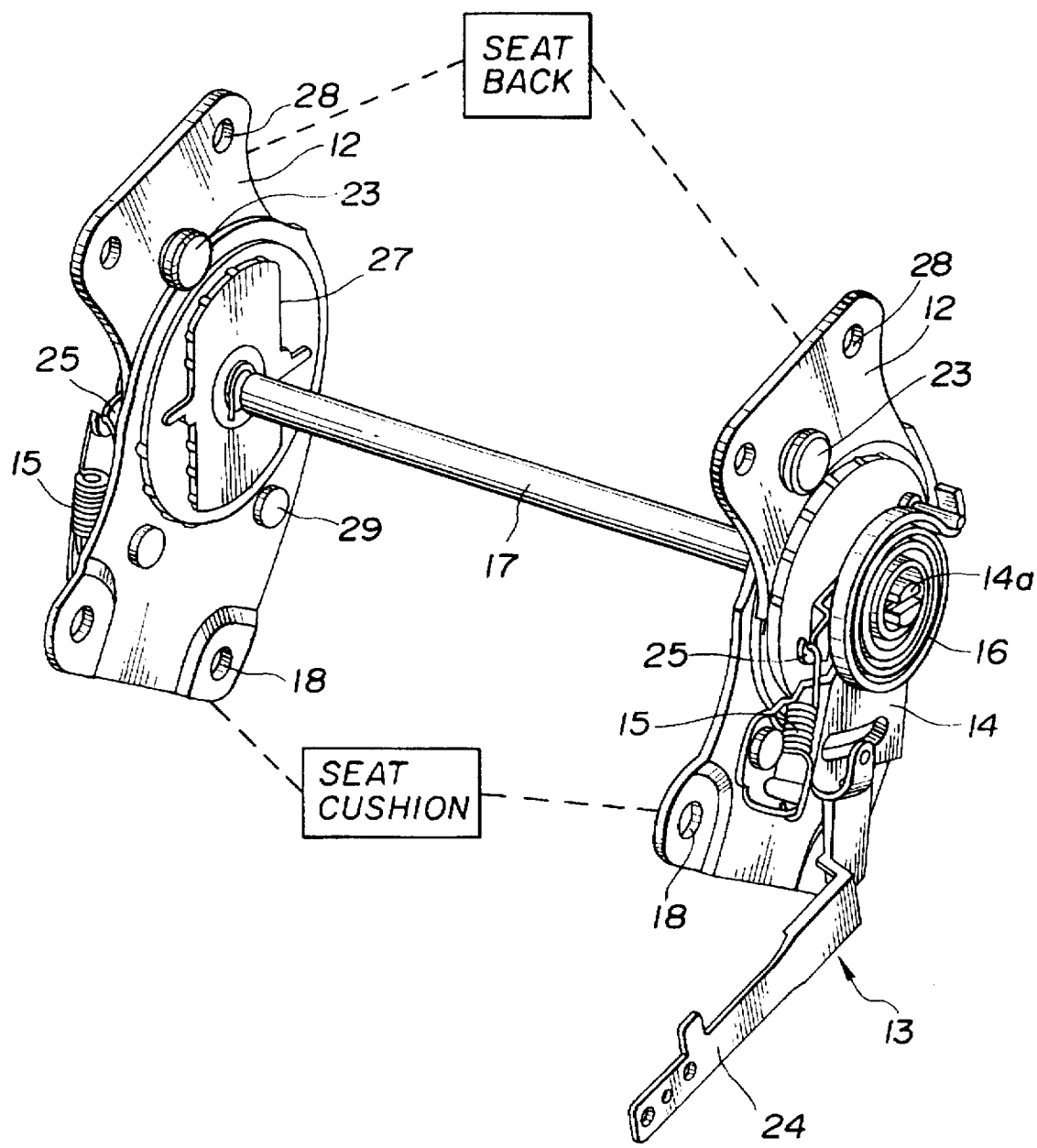
FIG. 8 is a perspective view illustrating the double-sided reclining assembly of the embodiment.

Referring now to the drawings, particularly to FIGS. 6 through 8, FIG. 8 shows the schematic layout of a double-sided seat reclining apparatus of the embodiment, and FIGS. 6 and 7 respectively show a dis-assembled view of an outside reclining device with a reclining-lever handle 24, and a dis-assembled view of an inside reclining device not including a reclining-lever handle. Hereinafter discussed in detail is the construction of the outside reclining device shown in FIG. 6.

In FIG. 6, reference sign 11 denotes a base firmly secured to a seat-cushion frame (not shown) through a plurality of mounting-bolt holes 18 by way of bolts or the like. A pivot shaft 20 of a reclining lever (or an operating lever) 13 is rotatably fitted to a central bore 19 of the base 11 through a central bore 12a formed in an arm 12 and a substantially rectangular central bore 21 formed in a cam member 1. As seen in FIG. 6, the pivot shaft 20 has a pair of diametrically opposing circular-arc faces and a pair of rectangular flat faces. Each circular-arc face serves as a sliding surface which is slidably fitted to the inner peripheral surface of the central bore 12a of the arm. For co-rotation with the pivot shaft 20 of the operating lever, the substantially rectangular bore 21 of the cam member 1 is contoured in a manner as to precisely fitted onto the pivot shaft 20 without any play. After the pivot shaft 20 is fitted into the bore 19 while supporting thereon both the arm 12 and the cam member 1, a snap ring 22 is fitted on the free end of the pivot shaft 20 to prevent the axial movement of the pivot shaft with respect to the base 11. The arm 12 is formed integral with a ring-gear like portion having a pair of diametrically-opposing circular-arc shaped inner toothed portions 10, which are point-symmetrical with respect to the axis of the pivot shaft 20. When assembling, a pair of toothed cam followers (8, 8), each of which will be abbreviated "tooth-inner part", are accommodated in an inner space defined between the ring-gear like portion of the arm 12 and a substantially rectangular recessed tooth-inner guide 27 as will be discussed later, so that the toothed portion 9 of each tooth-inner part 8 is meshable with the associated inner toothed portion 10 of the arm 12, and so that the cam member 1 is accommodated between the tooth-inner parts (8; 8). The arm 12 is fixedly connected to a seat-back frame (not shown) through mounting-bolt holes 28 by way of bolts. The operating lever (or the reclining lever) is formed with an armed portion 25 having a spring slot at which one hooked end of a return spring 15 for example a coiled tension spring is hanged. The other hooked end of the spring 15 is hanged at a bracket 14b of a holder 14 which is fixedly connected to the base 11 by means of rivets 29. Thus, the operating lever is biased to its initial position (a spring-loaded position) by way of the bias of the spring 15. Reference sign 23 denotes a guide pin 26 which insures a stable rotational movement of the arm. The holder 14 is formed integral with a slotted shaft 14a. The slotted portion of the slotted shaft 14a is engaged with the innermost central end 16a of a return spring 16 for example a spiral spring. The outermost curled end of the return spring 16 is engaged with a pin 26 fixed to the arm 12. Thus, the seat back fixedly connected to the arm is permanently forced to tilt forwards. As herebelow described in detail, the cam member 1 is formed with two pairs of first and second cam portions 4 and 5, whereas each tooth-inner part 8 is formed with a first recessed cam-follower portion (or a groove cut section) 6 contributing to an unmeshing action and being engageable with the associated first cam portion 4 and a second cam-follower portion 7 contributing to a meshing action and being engageable with the associated second cam portion 5.

As appreciated from FIGS. 1, 2, 6 and 7, the basic construction of the inside reclining device shown in FIG. 7 is essentially similar to that of the outside reclining device shown in FIG. 6, except that the cam profile of the cam member 1a of FIG. 7 and the cam profile of the cam member 1 of FIG. 6 are different from each other, and that the reclining lever 13a of FIG. 7 is not formed with a reclining-lever handle 24. Thus, the same reference signs used in the outside reclining device of FIG. 6 will be applied to the corresponding elements used in the inside reclining device of FIG. 7, for the purpose of comparison between the outside and inside reclining devices. In the shown embodiment, the outside reclining device is mechanically linked to the inside reclining device through a connecting pipe 17 with matching splines at its both ends, so that both ends of the connecting pipe 17 are assembled onto the respective splined shafts 30 of the reclining levers 13 and 13a without any play. FIG. 8 shows the assembled double-sided reclining apparatus in which the left and right reclining devices are linked to each other by the connecting pipe 17. When the reclining handle 24 is pulled upwards and rotated clockwise (viewing FIG. 8), the pivot shafts 20 and the connecting pipe 17 are rotated in one rotational direction and simultaneously the cam member 1 of the outside reclining device is rotated in synchronization with the clockwise rotational movement of the handle 24. Thus the first cam portion 4 of the cam member 1 (included in the outside reclining device) and the associated first cam-follower portion 6 of the tooth-inner part 8 are brought into a designated cam-connection with each other such that the toothed portion 9 of the tooth-inner part 8 is dis-engaged from the inner toothed portion 10 of the arm 12 by the radially inward displacement (or the radially inward sliding movement) of the tooth-inner part apart from the inner toothed portion 10. On the other hand, the first cam portion 4 of the cam member 1a (included in the inside reclining device) and the associated first cam-follower portion 6 of the tooth-inner part 8 are also brought into a designated cam-connection with each other such that the toothed portion 9 of the tooth-inner part 8 is dis-engaged from the inner toothed portion 10 of the arm 12 by the radially inward displacement of the tooth-inner part apart from the inner toothed portion 10. Owing to different cam profiles as will be detailed later, the cam connection between the first cam portion 4 of the outside cam member 1 and the associated first cam-follower portion 6 is different from the cam connection between the first cam portion 4 of the inside cam member 1a. As soon as the reclining devices both become unlocked with the lever fully pulled, the arm 12 and the seat back move forwards by way of the bias of the return spring 16. When the reclining lever is returned to its spring-loaded position after the seat back is shifted to a desired angular position, the pivot shafts 20 and the connecting pipe 17 are rotated in the other rotational direction by way of the bias of the spring 15 and thus the cam members 1 and 1a of the outside and inside reclining devices are rotated in synchronization with the anti-clockwise rotational movement of the reclining lever. Thus the toothed portions (9; 9) of the tooth-inner parts (8; 8) are engaged again with the respective inner toothed portions (10; 10) of the arm 12 by the radially outward displacement (or the radially outward sliding movement) of each tooth-inner part 8 towards the ring-gear like portion of the arm 12. Hitherto cam profiles of cam members employed in a pair of reclining devices are identical to each other and therefore the timing of meshing/unmeshing action of the inside reclining device is equal to that of the outside reclining device or the inside reclining device tends to operate with a slight time lag (or a slight phase lag) as compared with the outside reclining device directly coupled with an operating lever. On the other hand, in the double-sided reclining apparatus made according to the invention, as clearly seen in FIGS. 1 and 2, the cam profile of the cam member 1 of the outside reclining device is different from the cam profile of the cam member 1a of the inside reclining device. In more detail, the first cam portion 4 of the cam member 1a of the inside reclining device is slightly enlarged by a raised portion 2 in comparison with the first cam portion 4 of the cam member 1 of the outside reclining device, whereas the second cam portion 5 of the cam member 1a of the inside reclining device is slightly enlarged by a raised portion 3 in comparison with the second cam portion 5 of the cam member 1 of the outside reclining device. As herebelow explained in detail, the different cam profile of the cam member 1a is designed so that the timing of meshing of the inside reclining device takes priority over that of the outside reclining device, and so that the timing of unmeshing of the inside reclining device takes priority over that of the outside reclining device.

Figure 1:
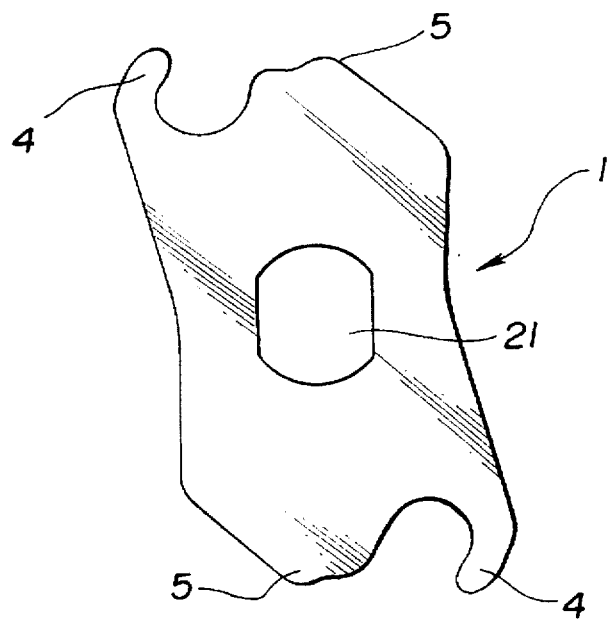
FIG. 1 is an elevational view illustrating a cam member of an outside reclining device, of one embodiment of a double-sided reclining apparatus made according to the invention.
Figure 2:
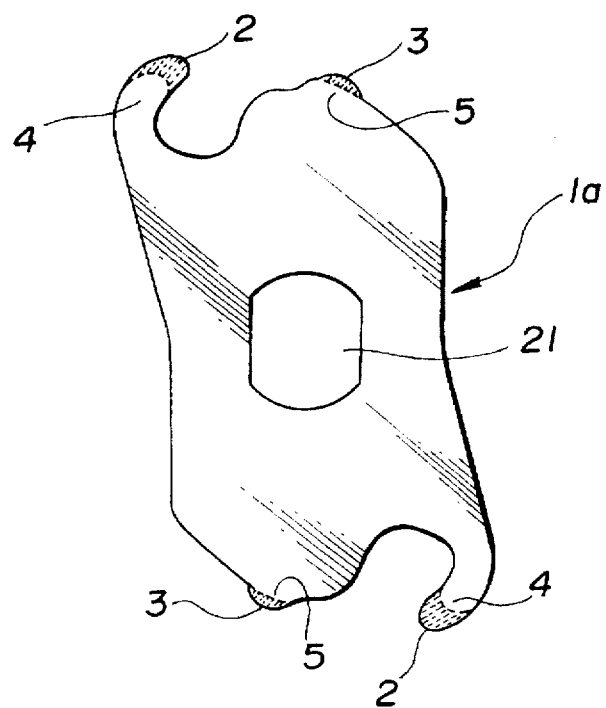
FIG. 2 is an elevational view illustrating a cam member of an inside reclining device, of the embodiment of the double-sided reclining apparatus of the invention.
Figure 3:
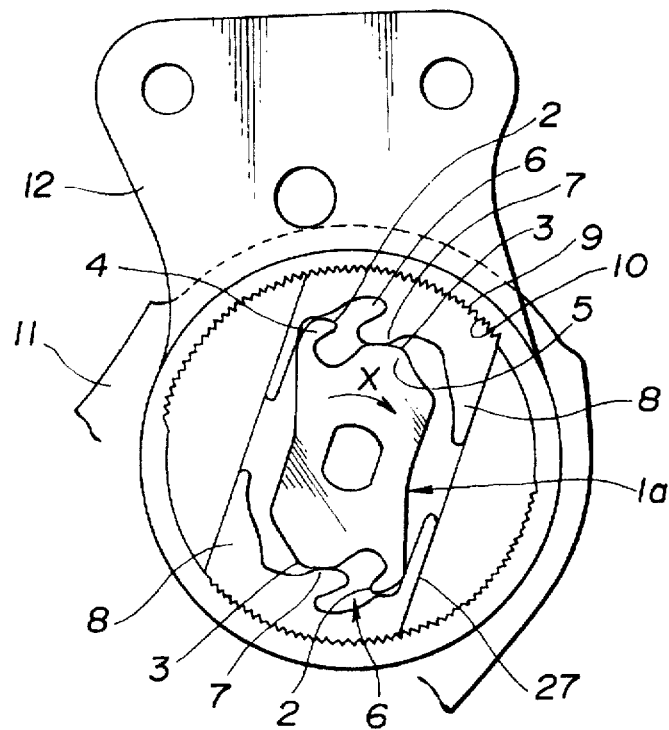
FIG. 3 is an elevational view illustrating an engaging relationship between the cam member and the tooth-inner part in an almost locked state of the inside reclining device.
Figure 4:
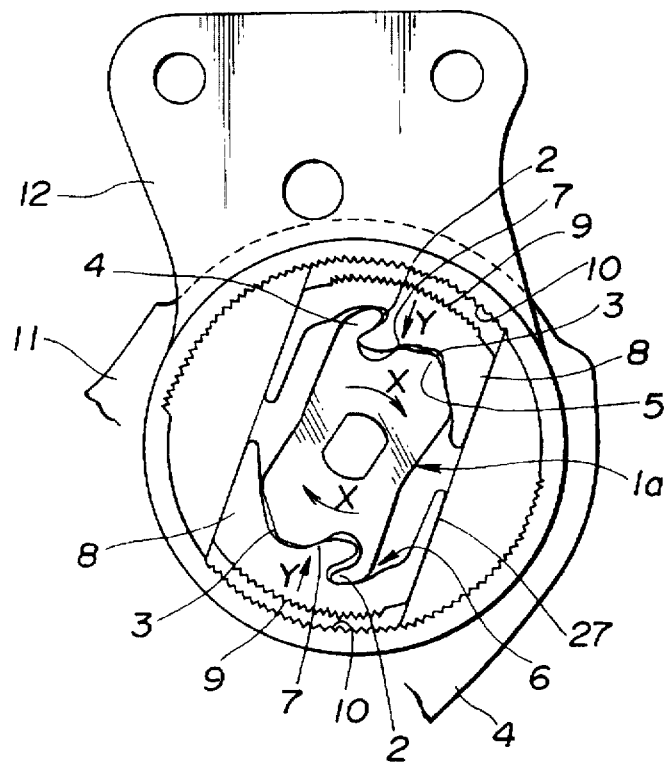
FIG. 4 is an elevational view illustrating another engaging relationship between the cam member and the tooth-inner part in a unlocked state (or a unmeshed state) of the inside reclining device.

As best seen in FIG. 1, the cam member 1 of the outside reclining device is formed of a flat plate having a high mechanical strength. The cam member 1 has a pair of cam sets, each consisting of the first finger-tip like cam portion 4 and the second undulated cam portion 5. A first cam set consisting of the first and second cam portions 4 and 5 and a second cam set consisting of the first and second cam portions 4 and 5 are point-symmetrical with respect to the central axis of the central bore 21 of the cam member. As indicated by the hatching in FIG. 2, the cam profile of the cam member 1a of the inside reclining device is slightly different from that of the cam member 1 of the outside reclining device. That is to say, the first cam portion 4 is integrally formed with a raised portion 2 which slightly extends from the tip (or the cam profile) of the first fingertip like cam portion, while the second cam portion 5 is integrally formed with a raised portion 3 which slightly extends from one convex face (or the cam profile) of the second undulated cam portion. The other geometry and dimensions of the cam member 1a are identical to those of the cam member 1. Since the basic motion of each tooth-inner part 8 in cam-connection with the cam member 1a included in the inside reclining device is similar to the motion of each tooth-inner part 8 in cam-connection with the cam member 1 included in the outside reclining device, only the motion of the tooth-inner part 8 associated with the cam member 1a is hereinbelow explained in detail for the purpose of simplification of the disclosure. As shown in FIGS. 3 and 4, a pair of diametrically-opposing tooth-inner parts (8; 8) are operatively accommodated in the substantially rectangular recessed tooth-inner guide 27 in such a manner as to be engageable with the respective cam sets (4, 5; 4, 5). The diametrically-opposing tooth-inner parts (8; 8) are radially slidably accommodated in the recessed tooth-inner guide 27 in a manner so as to be point-symmetrical with respect to the axis of the pivot shaft 20 (or to the central axis of the central bore 21). Each tooth-inner part 8 is formed on its inner wall with the first recessed cam-follower portion 6 which is brought into cam-connection with the first cam portion 4 and the second cam-follower portion 7 which is brought into cam-connection with the second cam portion 5, and formed on its outer wall with the toothed portion 9 which is engageable with the associated inner toothed portion 10 of the arm 12. Both side walls of the tooth-inner part 8 are loosely slidably fitted to and guided by the respective diametrically-opposing elongated side walls of the recessed tooth-inner guide 27. Owing to the installation relationship between the tooth-inner parts (8, 8) and the tooth-inner guide 27, the rotary motion of each tooth-inner part 8 is certainly prevented by way of abutment between the elongated side walls of the recessed tooth-inner guide 27 and the side walls of each tooth-inner part, even when torque is transmitted from the arm 12 through the two meshing pairs (9, 10; 9, 10) to the tooth-inner pair (8, 8). The inner periphery of the recessed cam-follower portion 6 is contoured so that when the cam member is rotated in its clockwise direction (viewing FIG. 3), the first finger-tip like cam portion 4 enters the groove cut of the recessed cam-follower portion 6 and then the tip of the first cam portion 4 abuts the bottom end of the recessed cam-follower portion 6. Thereafter, when the cam member is further rotated with the increased operating-angle of the reclining lever, the tooth-inner part 8 is radially inwardly displaced while being guided by the tooth-inner guide 27. In contrast to the above, when the cam member is rotated in the counterclockwise direction with the reclining lever turning to its initial position, the second undulated cam portion 5 abuts again with the second cam-follower portion 7, and thereafter according to the further rotation of the cam member the tooth-inner part 8 is radially outwardly displaced while being guided by the tooth-inner guide 27. Thus, the inside and outside reclining devices are unlocked through the clockwise rotary motion (viewing FIGS. 3 and 4) of the cam members (1; 1a), and locked through the anti-clockwise rotary motion of the cam members (1; 1a). The details of the cam connection and motions of the cam member 1a and the tooth-inner parts (8; 8) will be seen by referring to FIGS. 3, 4 and 5.

FIG. 3 shows a particular state (corresponding to the point C indicated in FIG. 5) in which the toothed portion 9 of the tooth-inner part 8 begins to mesh with the associated inner toothed portion 10 of the ting-gear like portion of the arm 12 by way of abutment between the raised portion 3 of the second cam portion 5 of the cam member 1a included in the inside reclining device and the second cam-follower portion 7 of the tooth-inner part, when the reclining lever is returned again to the spring-loaded position, and thus the cam member 1a rotates anti-clockwise. In the case that the cam member is formed on its second cam portion 5 with the raised portion 3 such as indicated by the hatching in FIG. 2, the second cam portion 5 of the cam member 1a can begin to abut the second cam-follower portion 7 at such an angular position of the cam member 1a as shown in FIG. 3. However, in the case that the cam member does not have a raised portion 3 on its second cam portion 5 just like the cam member 1 included in the outside reclining device, the second cam portion 5 of the cam member 1 cannot begin to abut the second cam-follower portion 7 unless the cam member 1 included in the outside reclining device further rotates anti-clockwise from the angular position shown in FIG. 3. In other words, due to the presence or absence of the raised portion 3, the timing of locking operation of the outside reclining device is intentionally delayed as compared with the timing of locking operation of the inside reclining device. That is, the raised portion 3 formed on the second undulated cam portion 5 ensures a slight mechanical phase-lead of the inside reclining device with respect to the outside reclining device, during the anti-clockwise rotation of the reclining lever.

In contrast to the above, when the cam member 1a is rotated in the clockwise direction indicated by the arrow X from the engaging state as shown in FIG. 3, by pulling up the lever, the tip of the raised portion 2 of the first cam portion 4 abuts the bottom end of the recessed cam-follower portion 6. Thereafter, in the event that the cam member 1a is further rotated in the clockwise direction indicated by the arrow X, as indicated by the arrows Y in FIG. 4 the tooth-inner parts (8; 8) radially and inwardly move along the diametrically-opposing elongated side walls of the substantially rectangular recessed tooth-inner guide 27. As a result of this, the toothed portions (9; 9) of the tooth-inner pair are unmeshed from the respective inner toothed portions (10; 10). However, in the case that the cam member does not have a raised portion 2 on its first cam portion 4 just like the cam member 1 included in the outside reclining device, as compared with the cam member 1a having the raised portion 2, the cam member 1 requires an additional clockwise rotation for the purpose of unmeshing the toothed portions 9 from the respective inner toothed portions 10. Thus, in the absence of the raised portion 2, the first cam portion 4 of the cam member 1 included in the outside reclining device begins to abut with the bottom end of the recessed cam-follower portion 6 with a slight time lag (or a slight phase lag), in comparison with the cam member 1a included in the inside reclining device. Due to the presence or absence of the raised portion 2, the timing of unlocking operation of the outside reclining device is intentionally delayed as compared with the timing of unlocking operation of the inside reclining device. That is, the raised portion 2 formed on the first finger-tip like cam portion 4 ensures a slight mechanical phase-lead of the inside reclining device with respect to the outside reclining device, during the clockwise rotation of the reclining lever. As set forth above, the locking or unlocking operation of the inside reclining device takes priority over the outside reclining device, owing to the cam-profile difference.

Figure 5:
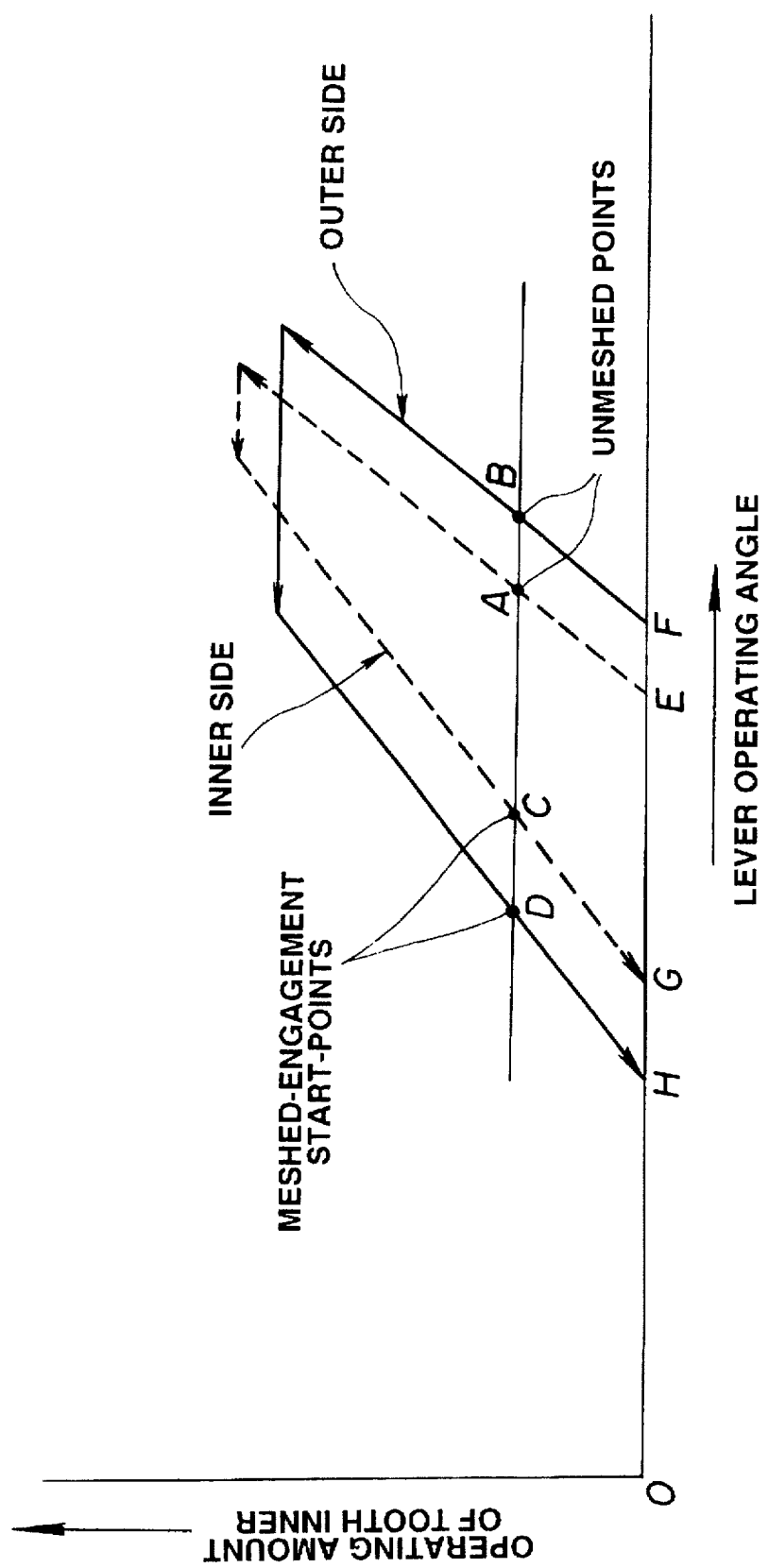
FIG. 5 is a chart showing the relationship between an operating angle of the reclining lever and an operating amount (or a relative displacement) of the tooth-inner part in case of both the inside reclining device (as indicated by the broken line) and the outside reclining device (as indicated by the solid line).

Referring now to FIG. 5, the axis of abscissa is the reclining-lever operating angle, whereas the axis of ordinate is the operating amount or radial displacement of the tooth-inner part 8. The increase in the lever operating angle means that an increase in clockwise rotation of the lever. The decrease in the lever operating angle means that an increase in anti-clockwise rotation of the lever. The broken line in FIG. 5 indicates the operating characteristic of the inside reclining device, whereas the solid line indicates the operating characteristic of the outside reclining device. When the reclining lever is rotated clockwise (viewing FIG. 8) and the lever operating angle reaches an angle marked by the point E, the raised portion 2 of the first cam portion 4 of the cam member 1a of the inside reclining device begins to engage with the first cam-follower portion 6 of the tooth-inner part 8. Under this condition, when the lever is further rotated clockwise with the increased operating angle, the tooth-inner pair (8; 8) gradually shift radially inwardly apart from the respective inner toothed portions (10; 10) of the ring-gear like portion of the arm 12. As soon as the relative displacement of each tooth-inner part 8 to the inner periphery of the ring-gear like portion of the arm 12 reaches a predetermined value as indicated by the line segment horizontally passing through the point A in FIG. 5, the toothed portions (9; 9) of the tooth-inner pair (8; 8) employed in the inside reclining device are unmeshed from the respective diametrically-opposing inner toothed portions 10 formed on the inner periphery of the ring-gear like portion of the arm 12, with the result that the inside reclining device is unlocked at the lever operating angle equivalent to the point A. On the other hand, in case of the outside reclining device, when, with the lever rotated clockwise, the operating angle reaches an angle (marked by the point F) greater than the operating angle such as indicated by the point E, the first cam portion 4 of the cam member 1 of the outside reclining device begins to engage with the first cam-follower portion 6 of the tooth-inner part 8. Thereafter, with further clockwise rotation of the lever, when the lever operating angle reaches an angle (indicated by the point B) greater than the operating angle such as indicated by the point A, the toothed portions (9; 9) of the tooth-inner pair (8; 8) are unmeshed from the respective diametrically-opposing inner toothed portions (10; 10) with the result that the outside reclining device is unlocked at the lever operating angle equivalent to the point B with a slight time lag (a slight phase lag) in comparison with the inside reclining device. When the lever is released (see the uppermost horizontal arrows respectively indicated by the broken line and the solid line) after the maximum operating angle has been reached (see the arrows up-sloped from the points A and B), the lever rotates towards its spring-loaded position, i.e., in the anti-clockwise direction (or in the direction of decrease in the operating angle) by means of the return spring 15. In the case of the inside reclining device, when the operating angle reaches an angle indicated by the point C along the arrow down-sloped from the tip of the uppermost horizontal arrow indicated by the broken line, the toothed portions (9; 9) of the tooth-inner pair (8: 8) are brought into meshed-engagement with the respective diametrically-opposing inner toothed portions (10; 10) of the ring-gear like portion of the arm 12 by way of abutment between the raised portion 3 of each second cam portion 5 of the cam member 1a and the associated second cam-follower portion 7. Therefore, the inside reclining device begins to lock at the operating angle equivalent to the point C. On the other hand, in the case of the outside reclining device, when the operating angle reaches an angle indicated by the point D along the arrow down-sloped from the tip of the uppermost horizontal arrow indicated by the solid line, the toothed portions (9; 9) of the tooth-inner pair (8: 8) are brought into meshed-engagement with the respective diametrically-opposing inner toothed portions (10; 10) by way of abutment between each second cam portion 5 of the cam member 1 and the associated second cam-follower portion 7. Therefore, the outside reclining device begins to lock at the operating angle equivalent to the point D. Owing to the phase difference resulting from the difference of cam profiles of the cam members 1 and 1a, the operating angle equivalent to the point D is less than the operating angle equivalent to the point C. The points C and D correspond to the partly-locked states of the inside and outside reclining devices. Under these conditions, as soon as the point G has been reached from the point C and thus the relative-displacement of the tooth-inner pair (8; 8) included in the inside reclining device to the ting-gear like portion of the arm 12 becomes reached zero, the inside reclining device is kept at its completely-locked state or fully-locked state. On the other hand, in the ease of the outside reclining device, as soon as the point H (corresponding to an operating angle less than the operating angle indicated by the point G) has been reached from the point C and thus the relative-displacement of the tooth-inner pair (8; 8) included in the outside reclining device to the ring-gear like portion of the arm 12 becomes reached zero, the outside reclining device is kept at its completely-locked state.

With the previously-described arrangement, as regards both lock and unlock timings, the inside reclining device not employing a reclining-lever handle can take priority over the outside reclining device employing a reclining-lever handle. This insures stable reclining-lever action, irrespective of dimensional errors, torsion of the connecting rod, or inadmissible play of a reclining-lever action transmitting linkage. Thus, the double-sided reclining apparatus of the invention can insure a good feeling during operation of the reclining apparatus, since the inside reclining device has already been locked or unlocked at the time when the driver or passenger has felt a locked or unlocked state of the outside reclining device by his or her hand resting on the lever.

As set out above, in the shown embodiment, in order to ensure a slight mechanical phase-lead of an inside reclining device to an outside reclining device, a cam profile of a cam member included in the inside reclining device is designed to be different from a cam profile of a cam member included in the outside reclining device. Alternatively, a section of a cam-follower portion of a so-called tooth-inner part included in the inside reclining device may be designed to be different from a section of a cam-follower portion of a so-called tooth-inner part included in the outside reclining device on the assumption that cam profiles of cam members included in the respective reclining devices are identical to each other.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A double-sided reclining apparatus, comprising:
   a first reclining device equipped with a reclining-lever handle and a second reclining device, each including:
   a base adapted to be fixedly connected to a seat cushion,
   an arm adapted to be fixedly connected to a seat back and rotatably supported on said base through a pivot shaft, said arm having a first toothed portion, and
   a set of cam and toothed cam follower in cam-connection with each other, said toothed cam follower having a second toothed portion meshable with and unmeshable from said first toothed portion, said cam and said toothed cam follower being cooperative with each other for causing meshed-engagement of said second toothed portion with said first toothed portion through a rotary motion of said cam in a first rotational direction to lock the reclining device, and for causing dis-engagement of said second toothed portion from said first toothed portion through a rotary motion of said cam in a second rotational direction opposed to said first rotational direction to unlock the reclining device; and
   a connecting pipe through which said cam included in said first reclining device is mechanically linked to said cam included in said second reclining device;
   wherein a cam profile of said cam included in said second reclining device is formed with at least one raised portion, said at least one raised portion being enlarged greater than a cam profile of said cam included in said first reclining device, for providing a mechanical phase-lead of said second reclining device with respect to both locking and unlocking actions of said first reclining device.

2. A double-sided reclining apparatus as claimed in claim 1, wherein each of said first and second reclining devices further comprises a guide for guiding said toothed cam follower to cause a radially outward sliding movement of said toothed cam follower towards said first toothed portion through said cam-connection during the rotary motion of said cam together with said pivot shaft in said first rotational direction and to cause a radially inward sliding movement of said toothed cam follower apart from said first toothed portion through said cam-connection during the rotary motion of said cam together with said pivot shaft in said second rotational direction.

3. A double-sided reclining apparatus for an automobile seat, comprising:
   an inside reclining device adapted to face to a center line of an automotive vehicle and an outside reclining device equipped with a reclining-lever handle and adapted to face apart from said center line, each of said inside and outside reclining devices including:

a base adapted to be fixedly connected to a seat cushion, an arm adapted to be fixedly connected to a seat back and rotatably supported on said base, said arm having a pair of diametrically opposed inner toothed portions, a pair of toothed cam followers, each having first and second cam-follower portions, and a toothed portion meshable with and unmeshable from an associated one of said inner toothed portions, a cam member being formed on an outer periphery thereof with at least first and second cam portions, said first cam portion being in cam-connection with said first cam-follower portion and said second cam portion being in cam-connection with said second cam-follower portion, a pivot shaft firmly fitted to said cam member for causing meshed-engagement of said toothed portions with said inner toothed portions through a rotary motion of said pivot shaft in a first rotational direction to lock the reclining device, and for causing disengagement of said toothed portions from said inner toothed portions through a rotary motion of said pivot shaft in a second rotational direction opposing said first rotational direction to unlock the reclining device, and means for biasing said pivot shaft in said first rotational direction; and a connecting pipe through which said pivot shaft fitted to said cam member included in said outside reclining device is mechanically linked to said pivot shaft fitted to said cam member included in said inside reclining device;

wherein said first and second cam portions of said cam member included in said inside reclining device are formed with raised portions, said raised portions being enlarged greater than each cam profile of said first and second cam portions of said cam member included in said outside reclining device, for providing a mechanical phase-lead of said inside reclining device with respect to both locking and unlocking actions of said outside reclining device.

4. A double-sided reclining apparatus as claimed in claim 3, wherein each of said inside and outside reclining devices further comprises a guide for guiding said toothed cam followers to cause a radially outward sliding movement of each of said toothed cam followers towards said inner toothed portion through said cam-connection between said first cam portion and said first cam-follower portion during the rotary motion of said cam member together with said pivot shaft in said first rotational direction and to cause a radially inward sliding movement of each of said toothed cam followers apart from said inner toothed portion through said cam-connection between said second cam portion and said second cam-follower portion during the rotary motion of said cam member together with said pivot shaft in said second rotational direction.

5. A double-sided reclining apparatus as claimed in claim 4, wherein each of said inside and outside reclining devices further comprises a return spring for biasing said arm towards a maximum forward inclined position.

6. A double-sided reclining apparatus, comprising:

an inside reclining device adapted to face to a center line of an automotive vehicle and an outside reclining device equipped with a reclining-lever handle and adapted to face apart from said center line, each of said inside and outside reclining devices including:

a base adapted to fixedly connected to a seat cushion, an arm adapted to fixedly connected to a seat back and rotatably supported on said base, said arm having a pair of diametrically opposed inner toothed portions, a pair of toothed cam followers, each having first and second cam-follower portions, and a toothed portion meshable with and unmeshable from an associated one of said inner toothed portions, a cam member being formed on an outer periphery thereof with a first cam set consisting of first and second cam portions and a second cam set consisting of first and second cam portions, each first cam portion being in cam-connection with an associated one of said first cam-follower portions and each second cam portion being in cam-connection with an associated one of said second cam-follower portions, and said first and second cam sets formed on said cam member being point-symmetrical with respect to a central axis of said cam member, a pivot shaft firmly fitted to said cam member for causing meshed-engagement of said toothed portions with said inner toothed portions through a rotary motion of said pivot shaft in a first rotational direction to lock the reclining device, and for causing disengagement of said toothed portions from said inner toothed portions through a rotary motion of said pivot shaft in a second rotational direction opposing said first rotational direction to unlock the reclining device, and means for biasing said pivot shaft in said first rotational direction; and a connecting pipe through which said pivot shaft fitted to said cam member included in said outside reclining device is mechanically linked to said pivot shaft fitted to said cam member included in said inside reclining device;

wherein said first and second cam portions of each cam set of said cam member included in said inside reclining device are formed with raised portions, said raised portions being enlarged greater than each cam profile of said first and second cam portions of said each cam set of said cam member included in said outside reclining device, for providing a mechanical phase-lead of said inside reclining device with respect to both locking and unlocking actions of said outside reclining device.

* * * * *